(12) United States Patent
Nakahira

(10) Patent No.: US 7,489,356 B2
(45) Date of Patent: Feb. 10, 2009

(54) IMAGE PICKUP APPARATUS

(75) Inventor: Toshiaki Nakahira, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 564 days.

(21) Appl. No.: 11/333,290

(22) Filed: Jan. 18, 2006

(65) Prior Publication Data
US 2006/0197856 A1    Sep. 7, 2006

(30) Foreign Application Priority Data
Mar. 4, 2005    (JP) .............................. 2005-060498

(51) Int. Cl.
H04N 3/14    (2006.01)
H04N 5/335    (2006.01)
(52) U.S. Cl. ........................ 348/311; 348/294
(58) Field of Classification Search ............... 348/311, 348/294
See application file for complete search history.

(56) References Cited

U.S. PATENT DOCUMENTS 4,737,841 A * 4/1988 Kinoshita et al. .......... 348/280
4,926,258 A * 5/1990 Sasaki et al. .................. 348/72
5,693,948 A * 12/1997 Sayed et al. ........... 250/370.09
2003/0169346 A1    9/2003 Ojima et al.

FOREIGN PATENT DOCUMENTS

JP    2000-312312    11/2000

* cited by examiner

Primary Examiner—James M Hannett
(74) Attorney, Agent, or Firm—Oblon, Spivak, McClelland, Maier & Neustadt, P.C.

(57) ABSTRACT

An image pickup apparatus includes: a solid-state image pickup device having a plurality of photoelectric conversion elements, a plurality of vertical transfer paths disposed in respective vertical lines of the plurality of photoelectric conversion elements and configured to vertically transfer charges, a single horizontal transfer path configured to horizontally transfer the charges transferred from each of the vertical transfer paths, and two charge/voltage converters provided in both ends of the horizontal transfer path; and a transfer signal controller configured to control directions to which the charges are transferred in the horizontal transfer path, wherein the solid-state image pickup device is driven such that the image pickup signals are outputted from the two charge/voltage converters when a monitoring operation is carried out, and is driven such that the image pickup signals are outputted from one of the two charge/voltage converters when obtaining the image pickup signals for recording of a still image.

13 Claims, 6 Drawing Sheets

Transfer in left direction

Transfer in right direction

Transfer in lower direction

Transfer in upper direction

IMAGE PICKUP APPARATUS

BACKGROUND

The present invention relates to an image pickup apparatus. More particularly, the present invention relates to an improvement in a signal output section in the image pickup apparatus such as a digital still camera that outputs charges obtained by photoelectric conversion.

The number of pixels in a digital still camera is becoming even larger in recent years. On the other hand, multiplication of the pixels makes it difficult to perform a monitoring operation (the monitoring operation is normally in 1/15 second to 1/60 second).

In order to cope with such a problem, a conventional digital still camera performs thinning of a matrix in a vertical direction and increases a horizontal transfer frequency such that a frame frequency fits within the above-described monitoring operation of 1/15 second to 1/60 second. However, the thinning in the vertical direction of the matrix, so as to cope with further multiplication of the pixels, impairs a balance between horizontal resolution and vertical resolution, leading to degradation of image quality, while the increase in the horizontal transfer frequency significantly raises power consumption and may also causes a failure such as a transfer trouble.

As measures for those disadvantages, a type of charge-coupled device (CCD) having a plurality of horizontal transfer paths and output amplifiers now attracts attention. The problem on the frame frequency relating to the monitoring operation can be solved by such a type of CCD even when the multiplication of the pixels progresses further.

However, it is difficult to uniform a gain characteristic of each of the output amplifiers in a conventional technology. Hence, a problem occurs that, for example, amounts of output signals become different in every portion of the matrix divided by the output amplifiers into regions even when a photographic object having completely even luminance is photographed.

To solve the problem rendered by the conventional technology, an additional correction circuit may be employed in a digital signal processor (DSP), although this leads to increase in a price of the DSP. Even when the DSP having such a correction circuit capable of compensating the gain characteristics is employed and utilized, an adjustment process for adjusting input/output characteristics of the correction circuit becomes essential in addition to a production process.

Moreover, despite the adjustment of the correction circuit, it is difficult to make the gain characteristic of each of the output amplifiers to the same level completely, and thus a slight disparity of the gain characteristics between the output amplifiers is inevitably generated. In a commercial product which handles a still image such as the digital still camera, however, the slight disparity may lead to a crucial drawback.

SUMMARY

The present invention has been made to solve the above-mentioned problems, and therefore, at least one objective of the present invention is to provide an image pickup apparatus for realizing a mode adapted to output image pickup signals from a plurality of output amplifiers to increase a frame frequency and a mode adapted to output the image pickup signals from one of the output amplifiers to obtain high image quality.

To achieve these and other advantages and in accordance with the purpose of the invention, as embodied and broadly described herein, the invention provides an image pickup apparatus, comprising: a solid-state image pickup device; and a transfer signal controller, the solid-state image pickup device comprises: a plurality of photoelectric conversion elements arranged two-dimensionally; a plurality of vertical transfer paths disposed in respective vertical lines of the plurality of photoelectric conversion elements and configured to vertically transfer charges read out from the respective photoelectric conversion elements; a single horizontal transfer path configured to horizontally transfer the charges transferred from each of the vertical transfer paths; and two charge/voltage converters provided in both ends of the horizontal transfer path and configured to convert the charges into image pickup signals, the transfer signal controller is configured to control directions to which the charges are transferred in the horizontal transfer path of the solid-state image pickup device, wherein the image pickup apparatus is configured to drive the solid-state image pickup device such that the image pickup signals are outputted from the two charge/voltage converters when a monitoring operation is carried out, and wherein the image pickup apparatus is configured to drive the solid-state image pickup device such that the image pickup signals are outputted from one of the two charge/voltage converters when obtaining the image pickup signals for recording of a still image.

Following are preferred embodiments (1) to (4) of the image pickup apparatus according to the present invention. Any combinations thereof may be considered to be preferred ones of the present invention unless any contradictions occur.

(1) One of the two charge/voltage converters having a better signal/noise characteristic than the other charge/voltage converter is selected according to a previously measured noise characteristic to output the image pickup signals for the recording of the still image.

(2) The image pickup apparatus further comprises a selector configured to select whether one of the two charge/voltage converters is used or both of the two charge/voltage converters are used for outputting the image pickup signals according to shooting modes in which the number of images photographable per unit of time are different from each other.

(3) The transfer signal controller provides horizontal transfer pulses having a first phase relation to one half of the horizontal transfer path, and provides horizontal transfer pulses having a second phase relation to the other half of the horizontal transfer path to output the image pickup signals from the two charge/voltage converters when the monitoring operation is carried out.

(4) The transfer signal controller provides one of the horizontal transfer pulses having the first phase relation and the second phase relation to the horizontal transfer path to output the image pickup signals from one of the two charge/voltage converters when obtaining the image pickup signals for recording of the still image.

In addition, the present invention provides another image pickup apparatus, comprising: a solid-state image pickup device; and a transfer signal controller, the solid-state image pickup device comprises: a plurality of photoelectric conversion elements arranged two-dimensionally; a plurality of vertical transfer paths disposed in respective vertical lines of the plurality of photoelectric conversion elements and configured to vertically transfer charges read out from the respective photoelectric conversion elements; two horizontal transfer paths configured to horizontally transfer the charges transferred from each of the vertical transfer paths; and two charge/voltage converters provided in one of ends of each of the two horizontal transfer paths and configured to convert the charges into image pickup signals, the transfer signal controller is configured to control directions to which the charges are transferred in the vertical transfer paths of the solid-state image pickup device, wherein the image pickup apparatus is configured to drive the solid-state image pickup device such that the image pickup signals are outputted from the two charge/voltage converters when a monitoring operation is carried out, and wherein the image pickup apparatus is configured to drive the solid-state image pickup device such that the image pickup signals are outputted from one of the two charge/voltage converters when obtaining the image pickup signals for recording of a still image.

Following are preferred embodiments (1) to (4) of another image pickup apparatus according to the present invention. Any combinations thereof may be considered to be preferred ones of the present invention unless any contradictions occur.

(1) One of the two charge/voltage converters having a better signal/noise characteristic than the other charge/voltage converter is selected according to a previously measured noise characteristic to output the image pickup signals for the recording of the still image.

(2) The image pickup apparatus further comprises a selector configured to select whether one of the two charge/voltage converters is used or both of the two charge/voltage converters are used for outputting the image pickup signals according to shooting modes in which the number of images photographable per unit of time are different from each other.

(3) The transfer signal controller provides vertical transfer pulses having a first phase relation to one half of the vertical transfer paths, and provides vertical transfer pulses having a second phase relation to the other half of the vertical transfer paths to output the image pickup signals from the two charge/voltage converters when the monitoring operation is carried out.

(4) The transfer signal controller provides one of the vertical transfer pulses having the first phase relation and the second phase relation to the vertical transfer paths to output the image pickup signals from one of the two charge/voltage converters when obtaining the image pickup signals for recording of the still image.

Furthermore, the present invention provides yet another image pickup apparatus, comprising: a solid-state image pickup device; and a transfer signal controller, the solid-state image pickup device comprises: a plurality of photoelectric conversion elements arranged two-dimensionally; a plurality of vertical transfer paths disposed in respective vertical lines of the plurality of photoelectric conversion elements and configured to vertically transfer charges read out from the respective photoelectric conversion elements; two horizontal transfer paths configured to horizontally transfer the charges transferred from each of the vertical transfer paths; and four charge/voltage converters provided in both ends of each of the two horizontal transfer paths and configured to convert the charges into image pickup signals, the transfer signal controller is configured to control directions to which the charges are transferred in the horizontal transfer paths and in the vertical transfer paths of the solid-state image pickup device, wherein the image pickup apparatus is configured to drive the solid-state image pickup device such that the image pickup signals are outputted from the four charge/voltage converters when a monitoring operation is carried out, and wherein the image pickup apparatus is configured to drive the solid-state image pickup device such that the image pickup signals are outputted from one of the four charge/voltage converters when obtaining the image pickup signals for recording of a still image.

Following are preferred embodiments (1) and (2) of yet another image pickup apparatus according to the present invention. Any combinations thereof may be considered to be preferred ones of the present invention unless any contradictions occur.

(1) One of the four charge/voltage converters having a better signal/noise characteristic than the other charge/voltage converters is selected according to a previously measured noise characteristic to output the image pickup signals for the recording of the still image.

(2) The image pickup apparatus further comprises a selector configured to select whether one of the four charge/voltage converters is used or the plurality of charge/voltage converters are used for outputting the image pickup signals according to shooting modes in which the number of images photographable per unit of time are different from each other.

It is to be understood that both the foregoing general description and the following detailed description are exemplary, and are intended to provide further explanation of the invention as claimed.

The present application is based on and claims priority from Japanese application No. 2005-060498, filed Mar. 4, 2005, the disclosure of which is hereby incorporated by reference herein in its entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
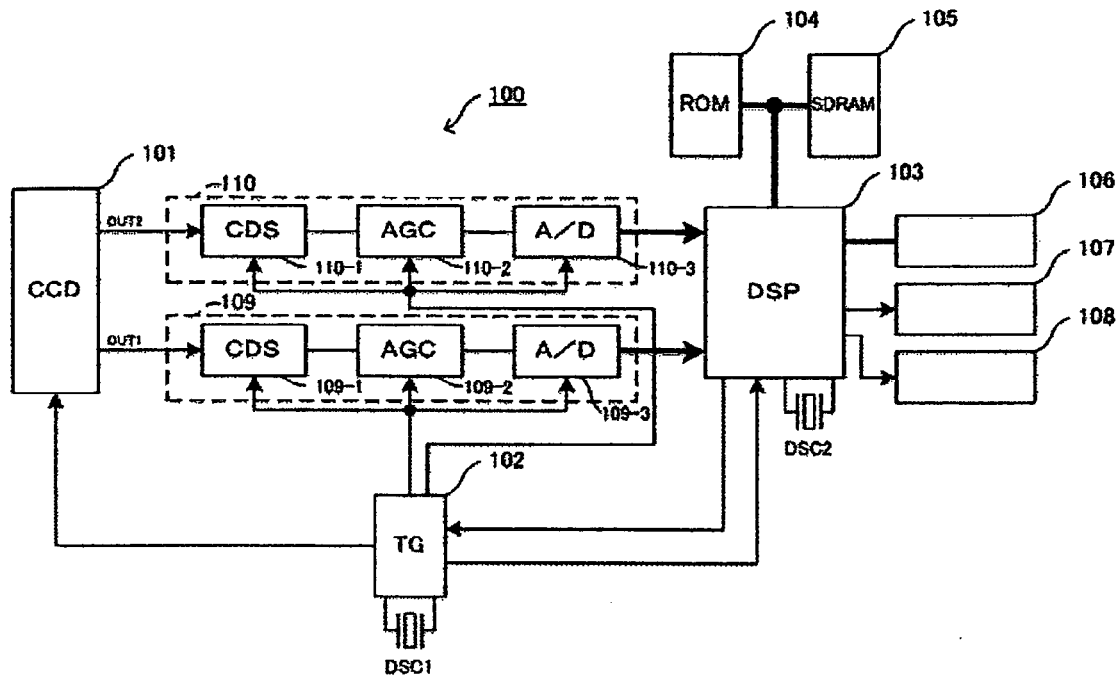
FIG. 1 is a block diagram showing a structure of an image pickup apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIG. 1 is a block diagram schematically illustrating a structure of an image pickup apparatus according to a first embodiment of the present invention. Referring to FIG. 1, the image pickup apparatus according to the present embodiment is a digital still camera wherein the number of outputs of a CCD (Charge-Coupled Device) is two. It is to be noted here that FIG. 1 only illustrates an image pickup section, and an illustration of optical system, a drive system and so on are omitted.

The image pickup apparatus 100 according to the present embodiment comprises the CCD 101, a TG (Timing Generator) 102, a DSP (Digital Signal Processor) 103, a ROM 104, a SDRAM 105, a memory card I/F (Interface) 106, an external display I/F 107, a display device 108, and F/E-ICs (Front/End-Integrated Circuits) 109, 110.

The F/E-IC 109 comprises a CDS (Correlated Double Sampling) portion 109-1, an AGC (Automatic Gain Control) portion 109-2 and an A/D (Analog/Digital) portion 109-3. The F/E-IC 110 similarly comprises a CDS portion 110-1, AGC portion 110-2 and an A/D portion 110-3.

The CCD 101 is a solid-state image pickup device in which photoelectric conversion elements are arranged two-dimensionally for photo-electrically converting an optical image. The TG 102 outputs drive-timing signals to each of the CCD 101, the CDS portion 109-1, the AGC portion 109-2 and the A/D portion 109-3, or the CDS portion 110-1, the AGC portion 110-2 and the A/D portion 110-3. The DSP 103, as a processor for signal processing, performs a previously-programmed image process to image data stored in the SDRAM 105 such as an image correction process which suppresses distortion of an image corresponding to the image data.

In the ROM 104, a control program for executing various processes on a CPU (Central Processing Unit) which is not shown is stored. Image information and so on which are processed by respective portions in the image pickup apparatus 100 are temporarily stored in the SDRAM 105. The memory card I/F 106 is an interface for writing and reading out the image data, the control program or the like to/from a memory card attached externally thereto. The external display I/F 107 is an interface for outputting the image data so as to display the image on an external display. The display device 108 is a monitor for displaying the photographed image, a menu and so on.

Each of the CDS portion 109-1 and the CDS portion 110-1 is a circuit for performing an image-denoising correlated double sampling to remove a noise component of inputted image signals. The AGC portion 109-2 and the AGC portion 110-2 are circuits for adjusting gains of the image signals, respectively. The A/D portion 109-3 and the A/D portion 110-3 convert the image signals of analog signals into digital signals to output the digitalized image signals to the DSP 103 as the image data, respectively.

Now, a description of movement of charges in a monitoring operation in the image pickup apparatus according to the present invention having the structure described above will be given below with reference to FIG. 2 and FIG. 3. Wherein, the CCD 101 shown in FIG. 2 arranges the photoelectric conversion elements 120 two-dimensionally, and includes a plurality of vertical transfer paths 121 and a single horizontal transfer path 122 for horizontally transferring the charges transferred from each of the vertical transfer paths 121, whereas the CCD 101 shown in FIG. 3 also arranges the photoelectric conversion elements 120 two-dimensionally but includes the plurality of vertical transfer paths 121 and two horizontal transfer paths 122 for horizontally transferring the charges transferred from each of the vertical transfer paths 121.

Figure 2:
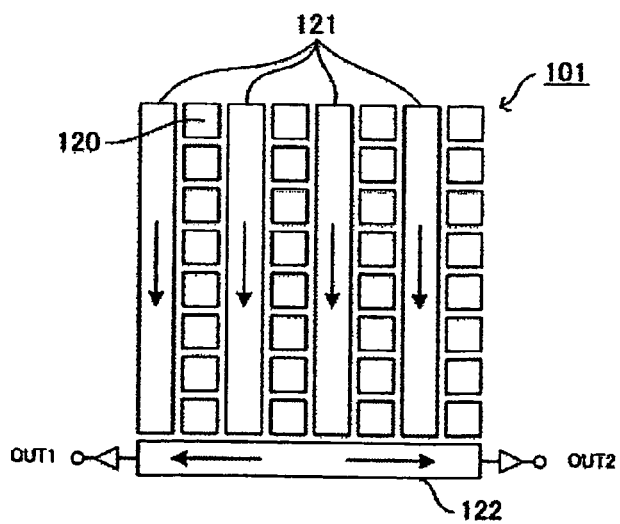
FIG. 2 shows movement of charges in a monitoring operation of the image pickup apparatus according to the first embodiment.
Figure 3:
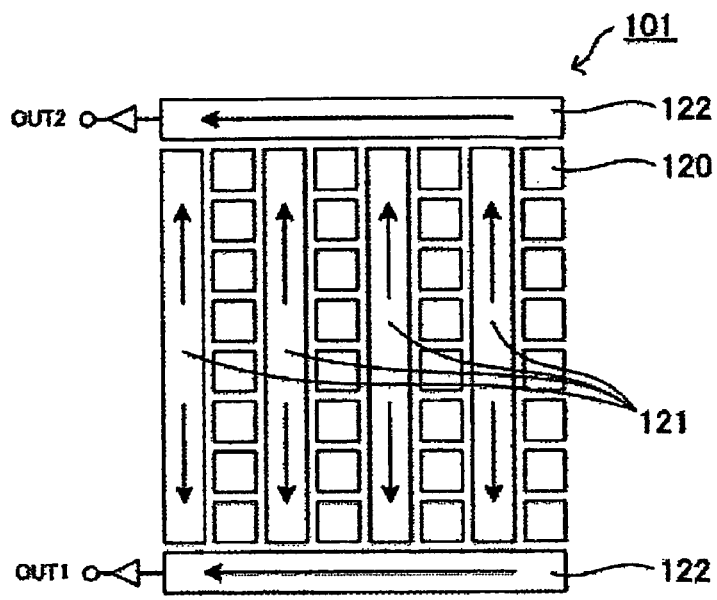
FIG. 3 also shows the movement of the charges in the monitoring operation of the image pickup apparatus according to the first embodiment.

During the monitoring operation, horizontal transfer pulses as shown in FIG. 2 or vertical transfer pulses as shown in FIG. 3 is given from the TG 102 to the CCD 101, such that image pickup signals are respectively outputted from two outputs (OUT1, OUT2) of the CCD 101. The DSP 103 controls the TG 102 to output the horizontal or vertical transfer pulses. The horizontal or vertical transfer pulses are accordingly given from the TG 102 to the CCD 101 in accordance with the control of the DSP 103.

Figure 4A:
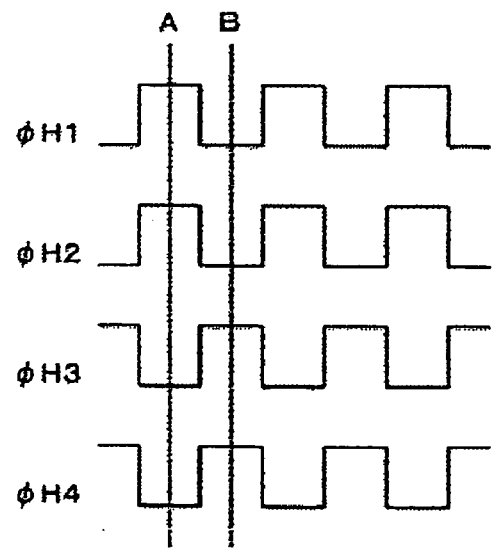
FIGS. 4A and 4B are diagrams each showing a phase relation of transfer pulses of FIG. 2.
Figure 4B:
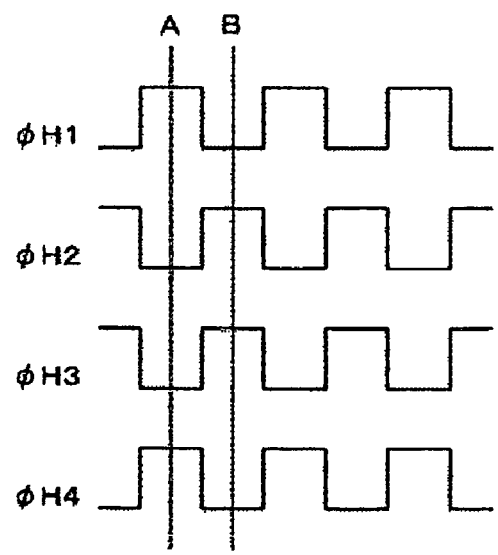
Figure 5A:
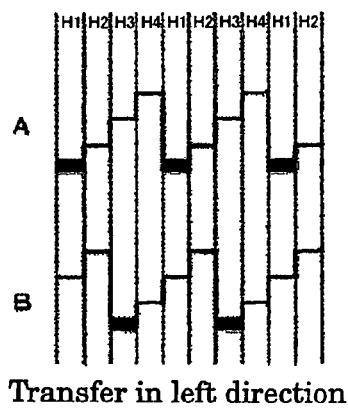
FIGS. 5A and 5B are diagrams each showing a potential representing the movement of charges of FIG. 2.
Figure 5B:
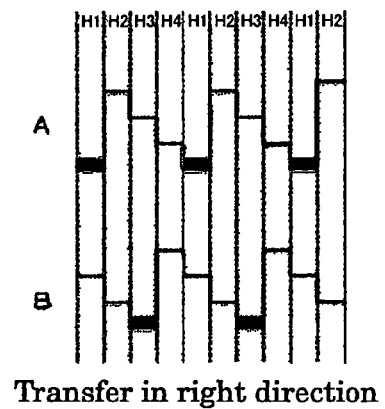

FIGS. 4A and 4B are diagrams each showing a phase relation of the horizontal transfer pulses, and FIGS. 5A and 5B are diagrams each showing the movement of the charges in the horizontal transfer pulses. Also, FIGS. 6A and 6B are diagrams each showing a phase relation of the vertical transfer pulses, and FIGS. 7A and 7B are diagrams each showing the movement of the charges in the vertical transfer pulses.

In one embodiment of the CCD 101 shown in FIG. 2, for example, the horizontal transfer pulses are given to a right half of the horizontal transfer path 122 of the CCD 101 shown in FIG. 2 with the phase relation shown by $\phi H1$ to $\phi H4$ in FIG. 4B, and the horizontal transfer pulses are given with the phase relation shown by $\phi H1$ to $\phi H4$ in FIG. 4A to a left half of the horizontal transfer path 122 of the CCD 101 shown in FIG. 2. Thereby, it is possible to obtain the image pickup signals from the two left and right outputs OUT1, OUT2 of the CCD 101.

Figure 6A:
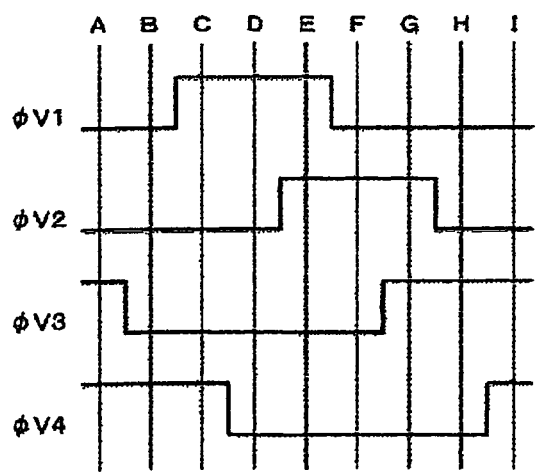
FIGS. 6A and 6B are diagrams each showing a phase relation of transfer pulses of FIG. 3.
Figure 6B:
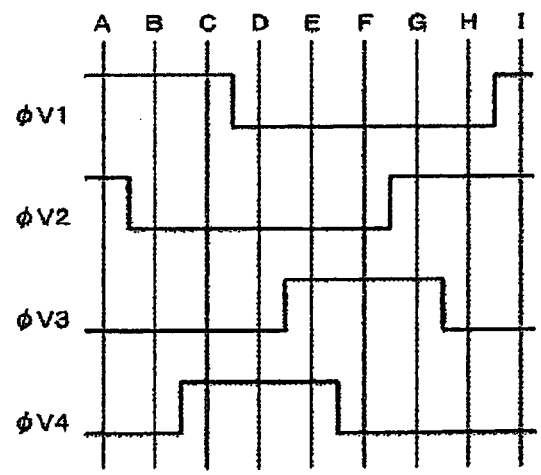
Figure 7A:
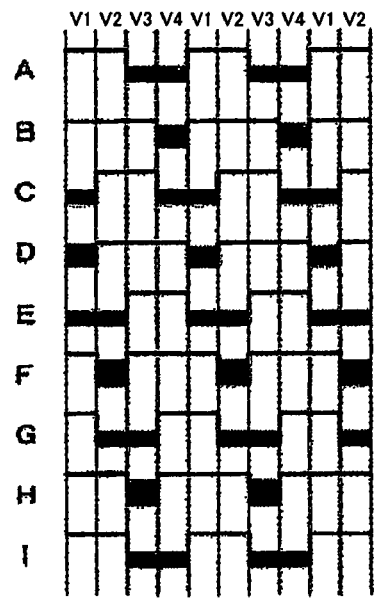
FIGS. 7A and 7B are diagrams each showing a potential representing the movement of charges of FIG. 3.
Figure 7B:
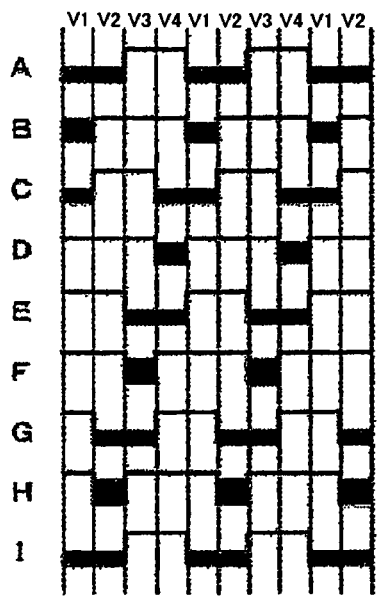

Similarly, according to one embodiment of the CCD 101 shown in FIG. 3, for example, the vertical transfer pulses are given to an upper half of the vertical transfer paths 121 of the CCD 101 shown in FIG. 3 with the phase relation shown by $\phi V1$ to $\phi V4$ in FIG. 6B, and the vertical transfer pulses are given to a lower half of the vertical transfer paths 121 with the phase relation shown by $\phi V1$ to $\phi V4$ in FIG. 6A. Thereby, it is possible to obtain the image pickup signals from the two upper and lower outputs OUT1, OUT2 of the CCD 101.

Therefore, it is possible to output the image with a frame frequency which is twice as much as a case, which will be described later, in which the image pickup signals are outputted from only one output.

The image pickup signals thus obtained from the CCD 101 are respectively subjected to the correlated double sampling in each of the CDS portions 109-1 and 110-1, applied with the predetermined gains in the AGC portions 109-2 and 110-2, and are then digitally converted by the A/D portions 109-3 and 110-3 to be sent to the DSP 103. The DSP 103 then corrects a disparity of the outputs of the OUT1 and the OUT2, i.e. the disparity of the amounts of gains between the OUT1 and the OUT2, according to an adjustment value which has been obtained by adjustment performed in advance. The correction of the amounts of outputs between the OUT1 and the OUT2 is thereby carried out by the DSP 103, and the DSP 103 further performs predetermined processes to output the final image pickup signals as an animated image to a LCD (Liquid Crystal Display), TV or the like.

Figure 8:
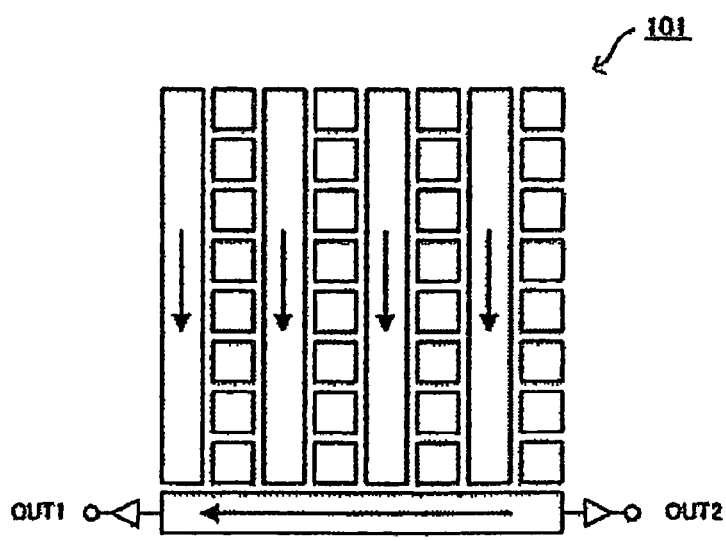
FIG. 8 shows movement of the charges in a frame reading operation of a CCD according to the first embodiment.

Next, a driving method in a frame reading operation for recording a still image of a photographic object will be explained hereinafter. FIG. 8 shows movement of the charges in the frame reading operation of the CCD 101 shown in FIG. 2, and FIG. 9 shows movement of the charges in the frame reading operation of the CCD 101 shown in FIG. 3.

In the frame reading operation, there is no distinction or demarcation of upper, lower, left and right of the transfer paths to which the horizontal and vertical transfer pulses having the phase relations are given, wherein, in one embodiment, the horizontal transfer pulses shown in FIG. 4A are given to the horizontal transfer path, while the vertical transfer pulses shown in FIG. 6A are given to the vertical transfer paths.

Figure 9:
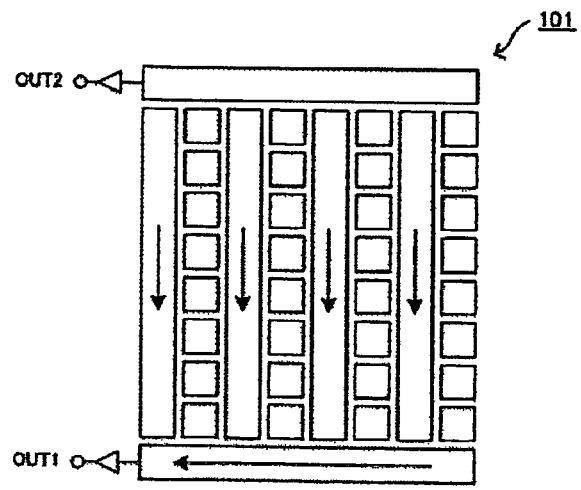
FIG. 9 also shows the movement of the charges in the frame reading operation of the CCD according to the first embodiment.

Accordingly, although there are two outputs of the OUT1 and OUT 2, the image pickup signals are outputted from only one of the outputs (for example, from OUT1 as shown in FIGS. 8 and 9) when the recording of the still image is performed. Therefore, it is possible to obtain the still image of high quality.

The image pickup signals are configured to be outputted from the OUT1 in the present embodiment. However, it is not limited to the OUT1. The skilled artisan in the art will readily appreciate that the image pickup signals can be outputted only from the OUT2. It is preferable to compare a S/N (Signal/Noise) characteristic of each of the output amplifiers to use the output amplifier having the better S/N characteristic when selecting either of the OUT1 or the OUT2. In one embodiment, accordingly, the output amplifier having the better S/N characteristic is identified or selected beforehand within the plurality of output amplifiers, and the image pickup signals are outputted through the identified or selected output amplifier when the recording of the still image is carried out.

Figure 10:
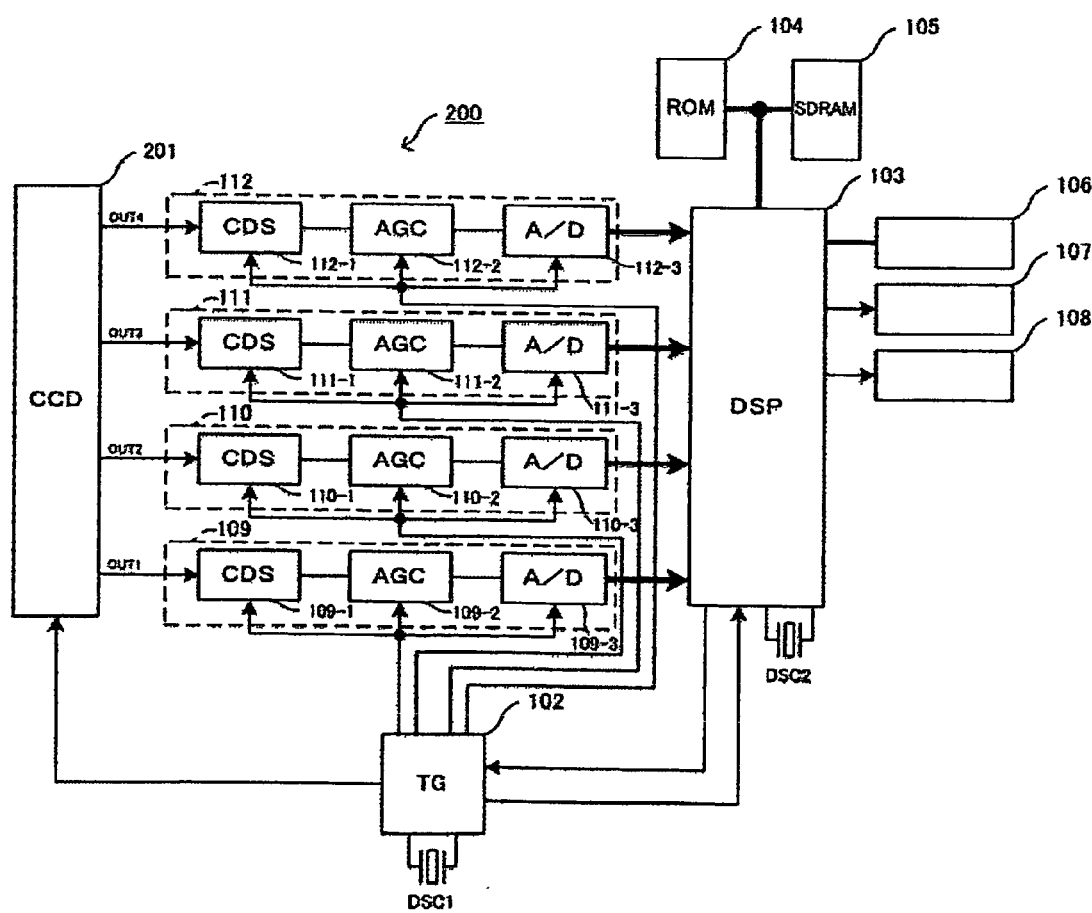
FIG. 10 is a block diagram showing a structure of an image pickup apparatus according to a second embodiment of the present invention.

FIG. 10 is a block diagram schematically showing a structure of an image pickup apparatus according to the second embodiment of the present invention. Referring to FIG. 10, the image pickup apparatus 200 of the second embodiment is one example of a digital still camera, which includes a CCD provided with four outputs (OUT1 to OUT4), for coping with a case when the number of pixels is further increased as compared with the image pickup apparatus of the first embodiment shown in FIG. 1, or when it is necessary to increase the frame frequency without increasing the number of pixels, i.e. the number of pixels is same as that of the first embodiment.

Figure 11:
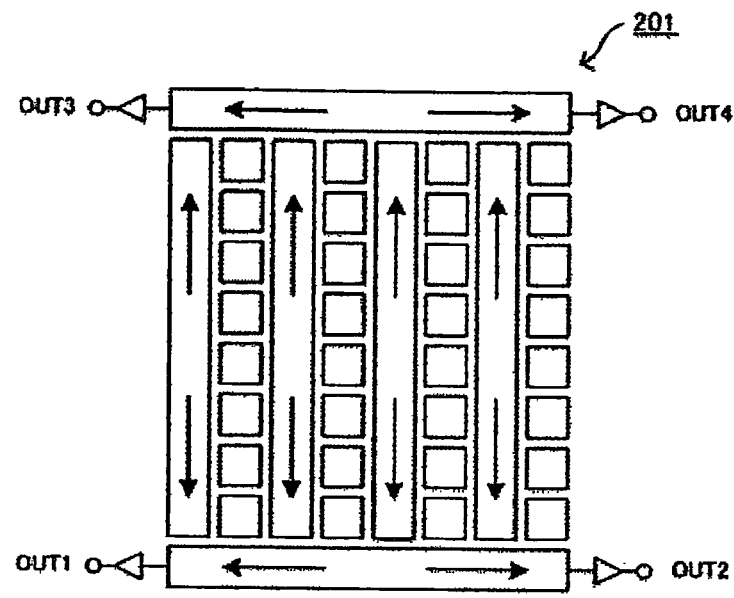
FIG. 11 shows movement of the charges in a monitoring operation of the image pickup apparatus according to the second embodiment.
Figure 12:
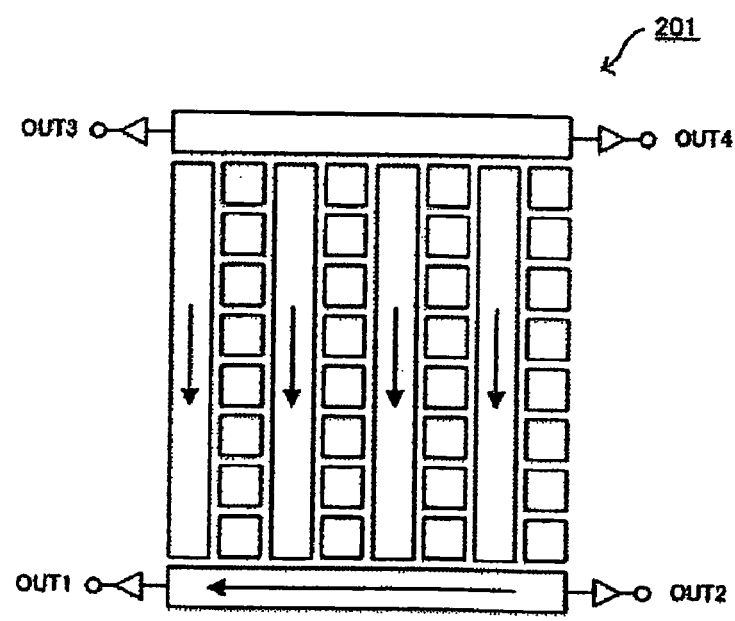
FIG. 12 shows movement of the charges in a frame reading operation of a CCD according to the second embodiment.

FIG. 11 shows movement of the charges in the monitoring operation, and FIG. 12 shows the movement of the charges in the frame reading operation, according to the CCD 201 shown in FIG. 10. Since the CCD 201 of the second embodiment is similar to the CCD 101 described in the first embodiment, an explanation on the type of pulses and to where such pulses are given will not be made in detail.

According to an embodiment of the present invention, a switch or a selector may be provided for a user to select whether to output the image pickup signals from only one of the output amplifiers, or to output the image pickup signals from the plurality of output amplifiers to shorten a photographing interval, so as to be prepared for such a case in which the image quality is not necessarily the utmost priority as in a continuous shooting mode.

Although the exemplary embodiments of the present invention have been described in the foregoing, it is to be noted that the image pickup apparatus according to the present invention is not limited to the digital still camera as explained in the embodiments. The image pickup apparatus according to the present invention is also applicable to a portable information terminal apparatus such as a so-called PDA (Personal Data Assistant), a portable cellular phone and so on, in which a camera function is incorporated. Such a portable information terminal apparatus has an appearance slightly different from the digital still camera but generally includes functions and a configuration similar to those of the digital still camera. It is therefore possible that the image pickup apparatus according to the present invention is employed in the portable information terminal apparatus.

Accordingly, the image pickup apparatus of the present invention at least has the following advantages:

1. It is possible to improve the image quality of the still image even in a system of the image pickup apparatus wherein a screen (or a matrix) is divided into several regions and the image pickup signals are outputted from the plurality of outputs to allow the frame frequency at the time of the monitoring operation to be at a predetermined level, by outputting the image pickup signals for the still image from only one of the outputs.

2. One of the output amplifiers having the better signal/noise characteristic than the other output amplifier is selected according to a previously measured noise characteristic to output the image pickup signals for the recording of the still image from the output amplifier having the better signal/noise characteristic. Therefore, it is possible to obtain the still image of higher quality.

3. The selector configured to select whether one of the output amplifiers is used or the plurality of the output amplifiers are used for outputting the image pickup signals according to shooting modes in which the number of images photographable per unit of time are different from each other is provided. Therefore, it is possible to cope with the case in which the high number of frames per unit of time is rather desired than the image quality, such as in the continuous shooting mode.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image pickup apparatus, comprising:
a solid-state image pickup device; and
a transfer signal controller,
the solid-state image pickup device comprising:
a plurality of photoelectric conversion elements arranged two-dimensionally;
a plurality of vertical transfer paths disposed in respective vertical lines of the plurality of photoelectric conversion elements and configured to vertically transfer charges read out from the respective photoelectric conversion elements;
a single horizontal transfer path configured to horizontally transfer the charges transferred from each of the vertical transfer paths; and
two charge/voltage converters provided in both ends of the horizontal transfer path and configured to convert the charges into image pickup signals, the transfer signal controller being configured to control directions to which the charges are transferred in the horizontal transfer path of the solid-state image pickup device, wherein the image pickup apparatus is configured to drive the solid-state image pickup device such that the image pickup signals are outputted from the two charge/voltage converters when a monitoring operation is carried out, and wherein the image pickup apparatus is configured to drive the solid-state image pickup device such that the image pickup signals are outputted from one of the two charge/voltage converters when obtaining the image pickup signals for recording of a still image.

2. The image pickup apparatus according to claim 1, wherein one of the two charge/voltage converters having a better signal/noise characteristic than the other charge/voltage converter is selected according to a previously measured noise characteristic to output the image pickup signals for the recording of the still image.

3. The image pickup apparatus according to claim 1, further comprising a selector configured to select whether one of the two charge/voltage converters is used or both of the two charge/voltage converters are used for outputting the image pickup signals according to shooting modes in which the number of images photographable per unit of time are different from each other.

4. The image pickup apparatus according to claim 1, wherein the transfer signal controller provides horizontal transfer pulses having a first phase relation to one half of the horizontal transfer path, and provides horizontal transfer pulses having a second phase relation to the other half of the horizontal transfer path to output the image pickup signals from the two charge/voltage converters when the monitoring operation is carried out.

5. The image pickup apparatus according to claim 4, wherein the transfer signal controller provides one of the horizontal transfer pulses having the first phase relation and the second phase relation to the horizontal transfer path to output the image pickup signals from one of the two charge/voltage converters when obtaining the image pickup signals for recording of the still image.

6. An image pickup apparatus, comprising:
a solid-state image pickup device; and
a transfer signal controller,
the solid-state image pickup device comprising:
a plurality of photoelectric conversion elements arranged two-dimensionally;
a plurality of vertical transfer paths disposed in respective vertical lines of the plurality of photoelectric conversion elements and configured to vertically transfer charges read out from the respective photoelectric conversion elements;
two horizontal transfer paths configured to horizontally transfer the charges transferred from each of the vertical transfer paths; and
two charge/voltage converters provided in one of ends of each of the two horizontal transfer paths and configured to convert the charges into image pickup signals,
the transfer signal controller being configured to control directions to which the charges are transferred in the vertical transfer paths of the solid-state image pickup device, wherein the image pickup apparatus is configured to drive the solid-state image pickup device such that the image pickup signals are outputted from the two charge/voltage converters when a monitoring operation is carried out, and wherein the image pickup apparatus is configured to drive the solid-state image pickup device such that the image pickup signals are outputted from one of the two charge/voltage converters when obtaining the image pickup signals for recording of a still image.

7. The image pickup apparatus according to claim 6, wherein one of the two charge/voltage converters having a better signal/noise characteristic than the other charge/voltage converter is selected according to a previously measured noise characteristic to output the image pickup signals for the recording of the still image.

8. The image pickup apparatus according to claim 6, further comprising a selector configured to select whether one of the two charge/voltage converters is used or both of the two charge/voltage converters are used for outputting the image pickup signals according to shooting modes in which the number of images photographable per unit of time are different from each other.

9. The image pickup apparatus according to claim 6, wherein the transfer signal controller provides vertical transfer pulses having a first phase relation to one half of the vertical transfer paths, and provides vertical transfer pulses having a second phase relation to the other half of the vertical transfer paths to output the image pickup signals from the two charge/voltage converters when the monitoring operation is carried out.

10. The image pickup apparatus according to claim 9, wherein the transfer signal controller provides one of the vertical transfer pulses having the first phase relation and the second phase relation to the vertical transfer paths to output the image pickup signals from one of the two charge/voltage converters when obtaining the image pickup signals for recording of the still image.

11. An image pickup apparatus, comprising:
a solid-state image pickup device; and
a transfer signal controller,
the solid-state image pickup device comprising:
a plurality of photoelectric conversion elements arranged two-dimensionally;
a plurality of vertical transfer paths disposed in respective vertical lines of the plurality of photoelectric conversion elements and configured to vertically transfer charges read out from the respective photoelectric conversion elements;
two horizontal transfer paths configured to horizontally transfer the charges transferred from each of the vertical transfer paths; and
four charge/voltage converters provided in both ends of each of the two horizontal transfer paths and configured to convert the charges into image pickup signals,
the transfer signal controller being configured to control directions to which the charges are transferred in the horizontal transfer paths and in the vertical transfer paths of the solid-state image pickup device, wherein the image pickup apparatus is configured to drive the solid-state image pickup device such that the image pickup signals are outputted from the four charge/voltage converters when a monitoring operation is carried out, and wherein the image pickup apparatus is configured to drive the solid-state image pickup device such that the image pickup signals are outputted from one of the four charge/voltage converters when obtaining the image pickup signals for recording of a still image.

12. The image pickup apparatus according to claim 11, wherein one of the four charge/voltage converters having a better signal/noise characteristic than the other charge/voltage converters is selected according to a previously measured noise characteristic to output the image pickup signals for the recording of the still image.

13. The image pickup apparatus according to claim 11, further comprising a selector configured to select whether one of the four charge/voltage converters is used or the plurality of charge/voltage converters are used for outputting the image pickup signals according to shooting modes in which the number of images photographable per unit of time are different from each other.

* * * * *